US012691584B2

(12) United States Patent
Yoshikuwa et al.

(10) Patent No.: US 12,691,584 B2
(45) Date of Patent: Jul. 28, 2026

(54) ROBOT SYSTEM AND ROBOT CELL

(71) Applicant: Kawasaki Jukogyo Kabushiki Kaisha, Kobe (JP)

(72) Inventors: Eiji Yoshikuwa, Kobe (JP); Toshiyuki Tsujimori, Kobe (JP); Hideshi Yamane, Kobe (JP); Shoichi Miyao, Kobe (JP); Yoshihiro Okazaki, Osaka (JP); Ryoichi Kitaguchi, Nara (JP); Yuichi Otsuji, Matsubara (JP); Masayoshi Hoshi, Takatsuki (JP); Atsuhiro Takamatsu, Osaka (JP); Masamitsu Yoshida, Osaka (JP); Shigetomo Matsui, Higashiosaka (JP); Hiromu Wakayama, Kobe (JP); Kanji Matsushima, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 271 days.

(21) Appl. No.: 17/778,857

(22) PCT Filed: Nov. 27, 2020

(86) PCT No.: PCT/JP2020/044198
§ 371 (c)(1),
(2) Date: May 23, 2022

(87) PCT Pub. No.: WO2021/107086
PCT Pub. Date: Jun. 3, 2021

(65) Prior Publication Data
US 2022/0410399 A1 Dec. 29, 2022

(30) Foreign Application Priority Data
Nov. 28, 2019 (JP) ................................. 2019-214948

(51) Int. Cl.
*B25J 9/16* (2006.01)
*B25J 5/00* (2006.01)

(52) U.S. Cl.
CPC ............. *B25J 9/1694* (2013.01); *B25J 5/007* (2013.01)

(58) Field of Classification Search
CPC ........ B25J 9/1694; B25J 5/007; B25J 19/005; B25J 9/12; B25J 13/088; B25J 19/0004; B25J 9/1602; B25J 19/0095; B62B 5/0079
(Continued)

(56) References Cited

U.S. PATENT DOCUMENTS

2013/0226341 A1* 8/2013 Sturm ................... A61G 7/1046
2014/0214195 A1 7/2014 Worsley
(Continued)

FOREIGN PATENT DOCUMENTS

CN 106985145 A 7/2017
DE 102016002781 A1 * 8/2016 ............ B25J 9/0009
(Continued)

*Primary Examiner* — Ellis B. Ramirez
(74) *Attorney, Agent, or Firm* — XSENSUS LLP

(57) ABSTRACT

This robot system includes: an automated guided vehicle that includes a support surface and automatically travels; a robot cell including a seat surface to be mounted on the support surface, a ground contact portion protruding downward from the seat surface so as to contact with a ground, an articulated arm, and a robot controller that controls operation of the articulated arm; and a switching mechanism that performs switching between a transferable state in which the seat surface is mounted on the support surface and the ground contact portion is separated from the ground, and a placed state in which the seat surface is separated from the support surface and the ground contact portion contacts with the ground.

15 Claims, 9 Drawing Sheets

(58) Field of Classification Search
USPC ............... 700/258, 245; 701/2, 24, 32.3, 66
See application file for complete search history.

(56) References Cited

U.S. PATENT DOCUMENTS

| | | | | |
|---|---|---|---|---|
| 2016/0236867 A1* | 8/2016 | Brazeau | ................... | B25J 5/007 |
| 2016/0236869 A1 | 8/2016 | Kimura et al. | | |
| 2018/0311822 A1* | 11/2018 | Kaminka | ............... | B25J 9/1682 |
| 2018/0326576 A1* | 11/2018 | Riedel | ................... | B25J 19/022 |
| 2021/0094184 A1* | 4/2021 | Gilchrist | ............... | B25J 9/1666 |
| 2021/0129314 A1* | 5/2021 | Kobari | ................... | B25J 13/088 |
| 2021/0362341 A1* | 11/2021 | Cote | ....................... | B66F 9/063 |

FOREIGN PATENT DOCUMENTS

| | | | | | |
|---|---|---|---|---|---|
| EP | 3398729 A1 * | 11/2018 | .............. | B25J 5/007 |
| EP | 3223088 B1 * | 10/2022 | .............. | B65G 1/10 |
| JP | 2016-508474 A | 3/2016 | | |
| JP | 2018-513817 A | 5/2018 | | |
| JP | 2020-82233 A | 6/2020 | | |
| WO | 2015/052825 A1 | 4/2015 | | |

* cited by examiner

PLACED STATE

TRANSFERABLE STATE

ROBOT SYSTEM AND ROBOT CELL

CROSS REFERENCE TO RELATED APPLICATIONS

This application is based on PCT filing PCT/JP2020/044198, filed Nov. 27, 2020, which claims priority to and the benefit of Japanese Patent Application No. 2019-214948 filed on Nov. 28, 2019, the entire disclosure of which is incorporated herein by reference.

TECHNICAL FIELD

The present invention relates to a robot system including an automated guided vehicle (AGV). In addition, the present invention relates to a robot cell that includes an articulated arm and a robot controller and is transferred by an automated guided vehicle.

BACKGROUND ART

PTL 1 discloses a robot system that transfers a rack storing items. In this robot system, a robot is an automated guided vehicle. The robot can lift the rack by raising an upper plate of the robot in a state of entering the space under the rack. By the robot traveling in a state of lifting the rack, the rack is transferred. By the robot lowering the upper plate, the rack is placed. The rack includes a transporter that transports items. After the rack is placed, the transporter is driven to transport items.

When the robot has entered the space under the rack, a connector of the robot is electrically connected to a connector counterpart of the rack. The transporter is supplied with power from a battery provided to the robot via the connector and the connector counterpart. The robot includes a controller that controls power supply, and operation of the transporter is controlled through power supply control by the controller.

CITATION LIST

Patent Literature

PTL 1: WO2015/052825

SUMMARY OF INVENTION

Technical Problem

In the robot system, unless the robot has entered the space under the rack, the transporter cannot be driven and items cannot be transported. Since the number of robots increases or the number of operable racks decreases, there is room for improvement in working efficiency.

Accordingly, an object of the present invention is to enhance efficiency of a robot system.

Solution to Problem

A robot system according to one aspect of the present invention includes: an automated guided vehicle that includes a support surface and automatically travels; a robot cell including a seat surface to be mounted on the support surface, a ground contact portion protruding downward from the seat surface so as to contact with a ground, an articulated arm, a robot controller that controls operation of the articulated arm, and a robot battery at least as a power source of the robot controller; and a switching mechanism that performs switching between a transferable state in which the seat surface is mounted on the support surface and the ground contact portion is separated from the ground, and a placed state in which the seat surface is separated from the support surface and the ground contact portion contacts with the ground.

With the above configuration, when the placed state is switched to the transferable state, the robot cell is separated from the ground and is supported by the automated guided vehicle. When the automated guided vehicle travels in the transferable state, the robot cell is transferred. When the transferable state is switched to the placed state, the robot cell is separated from the automated guided vehicle and is placed on the ground. When the robot cell is placed, the automated guided vehicle can travel in an idle state (travel in a state in which the robot cell is not mounted). The robot cell includes the articulated arm and the robot controller that controls operation thereof, and includes the robot battery serving at least as a power source of the robot controller. Thus, even when the automated guided vehicle is separated from the robot cell after the robot cell is placed, the robot cell can perform predetermined work, using the articulated arm.

A robot cell according to another aspect of the present invention is a robot cell to be transferred by an automated guided vehicle that includes a support surface and automatically travels, the robot cell including: a seat surface to be seated on the support surface; a ground contact portion protruding downward from the seat surface so as to contact with a ground; an articulated arm; a robot controller that controls operation of the articulated arm; a robot battery at least as a power source of the robot controller; and a mounting detector that detects whether or not the seat surface is mounted on the support surface at a time of switching between a transferable state in which the seat surface is mounted on the support surface and the ground contact portion is separated from the ground, and a placed state in which the seat surface is separated from the support surface and the ground contact portion contacts with the ground.

With the above configuration, when the robot cell is applied to the above robot system, the above effects can be provided to the robot system. The robot cell includes the mounting detector that detects whether or not the seat surface is mounted on the support surface. On the basis of a detection result from the mounting detector, it is possible to perform control that contributes to safety improvement of the robot system, such as not moving the articulated arm when the automated guided vehicle is not separated from the robot cell. This is advantageous for the robot system including the robot cell that can operate independently of the automated guided vehicle after the robot cell is transferred by the automated guided vehicle.

Advantageous Effects of Invention

The present invention can enhance efficiency of a robot system.

DESCRIPTION OF EMBODIMENTS

Hereinafter, an embodiment will be described with reference to the drawings.

Figure 1:
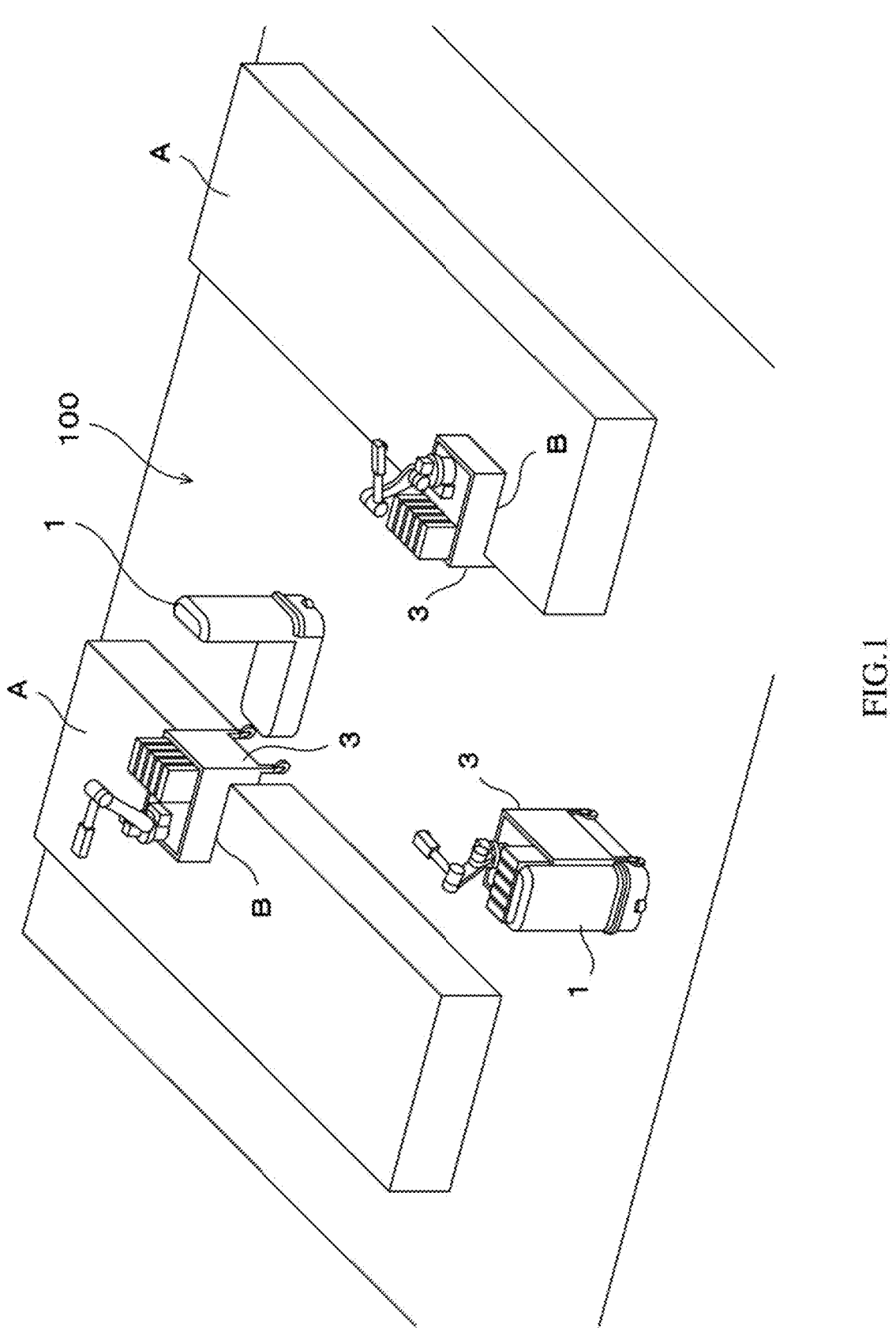
FIG. 1 is a perspective view showing a robot system according to an embodiment.

FIG. 1 is a perspective view showing a robot system 100 according to an embodiment. It is conceivable that the robot system 100 is applied to a production site where a human and a robot perform work together, in particular, a production site where multiple kinds of items are treated. Here, one typical example of the "robot" is a manipulator-type robot including a robot base, an articulated arm connected to the robot base, and a robot controller that controls operation of the articulated arm. One preferable example of a production site where the robot system 100 is applied is an assembly line for electronic components.

For example, in a line production system, multiple workspaces B are set along a line A. Works determined in advance for the respective workspaces B are performed on intermediate products flowing along the line A, at the respective workspaces B. A main worker may be either a human or a robot, and is selected as appropriate in accordance with work contents. In an assembly line for electronic components, a robot may perform work of inserting a lead wire of an electronic component into a board or work of welding the lead wire to the board.

When products to be produced along the line A are changed, work contents to be performed at the respective workspaces B are changed. Along with change of the work contents, a main worker at a certain workspace B may be changed from a human to a robot, and in this case, the robot is to be placed at the workspace B. Conversely, a main worker at a certain workspace B may be changed from a robot to a human, and in this case, the robot is to be removed from the workspace B. At a site where multiple kinds of items are produced on the same line A with a human and a robot operating together, as one of set-up changes, placement and removal of the robot are to be performed. The robot removed from the workspace B may be placed at a predetermined standby space out of the line A in the production site, or may be transferred to another workspace B where the robot should be newly placed, and may be placed at this workspace B again.

The robot system 100 according to the present embodiment includes one or more automated guided vehicles 1 that travel automatically, and one or more robot cells 3 to be transferred by the automated guided vehicles 1. The robot cell 3 has the robot configuration as described above. The robot system 100 is configured to be able to quickly place and remove the robot (robot cell 3). Thus, it is possible to solve such a problem that flexible relocation cannot be performed in accordance with work contents because removal of a robot once placed is complicated. Since set-up change can be immediately performed, production efficiency is improved. Even when set-up change frequently occurs, it is possible to perform flexible relocation in immediate response thereto at each time, whereby production efficiency can be kept high.

The number of the automated guided vehicles 1 and the number of the robot cells 3 can be changed as appropriate in accordance with the production site where the robot system 100 is applied. In the present embodiment, a configuration is made such that one automated guided vehicle 1 can transfer one robot cell 3. However, this is merely an example, and a configuration may be made such that one automated guided vehicle 1 can collectively transfer two or more robot cells 3. The robot system 100 is applicable to not only a production site where a line production system is adopted but also a production site where a cell production system is adopted.

Figure 2:
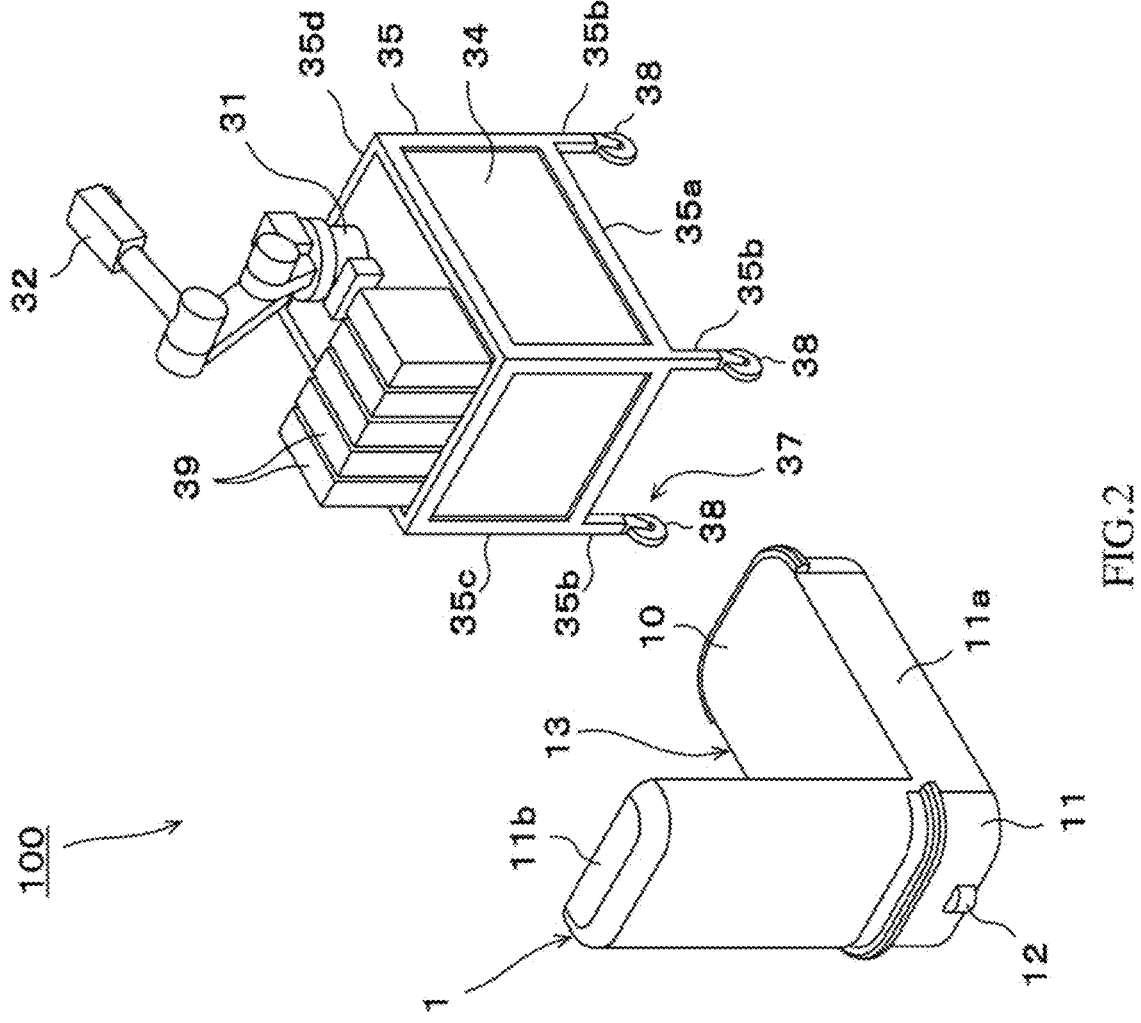
FIG. 2 is a perspective view showing an automated guided vehicle and a robot cell according to the embodiment.

With reference to FIG. 2, the automated guided vehicle 1 includes a vehicle body 11, wheels 12, and an ascending/descending body 13. The vehicle body 11 includes a horizontal portion 11a formed in a rectangular shape, and an erecting portion 11b extending upward from a rear end of the horizontal portion 11a, as an example. The wheels 12 are rotatably supported at the bottom of the vehicle body 11 (horizontal portion 11a). When the wheels 12 all contact with the ground, the horizontal portion 11a of the vehicle body 11 is substantially parallel to the ground, and the erecting portion 11b of the vehicle body 11 is substantially vertical to the ground. Although not shown in details, the automated guided vehicle 1 includes one or more front wheels and one or more rear wheels as the wheels 12. In the present embodiment, two front wheels and one rear wheel are provided. However, one front wheel and two rear wheels may be provided, or two front wheels and two rear wheels may be provided. The ascending/descending body 13 can ascend/descend relative to the vehicle body 11. The ascending/descending body 13 is provided to the horizontal portion 11a of the vehicle body 11, and has a horizontal surface. The surface (upper surface) of the ascending/descending body 13 forms a support surface 10 on which the robot cell 3 is to be mounted.

Figure 4:
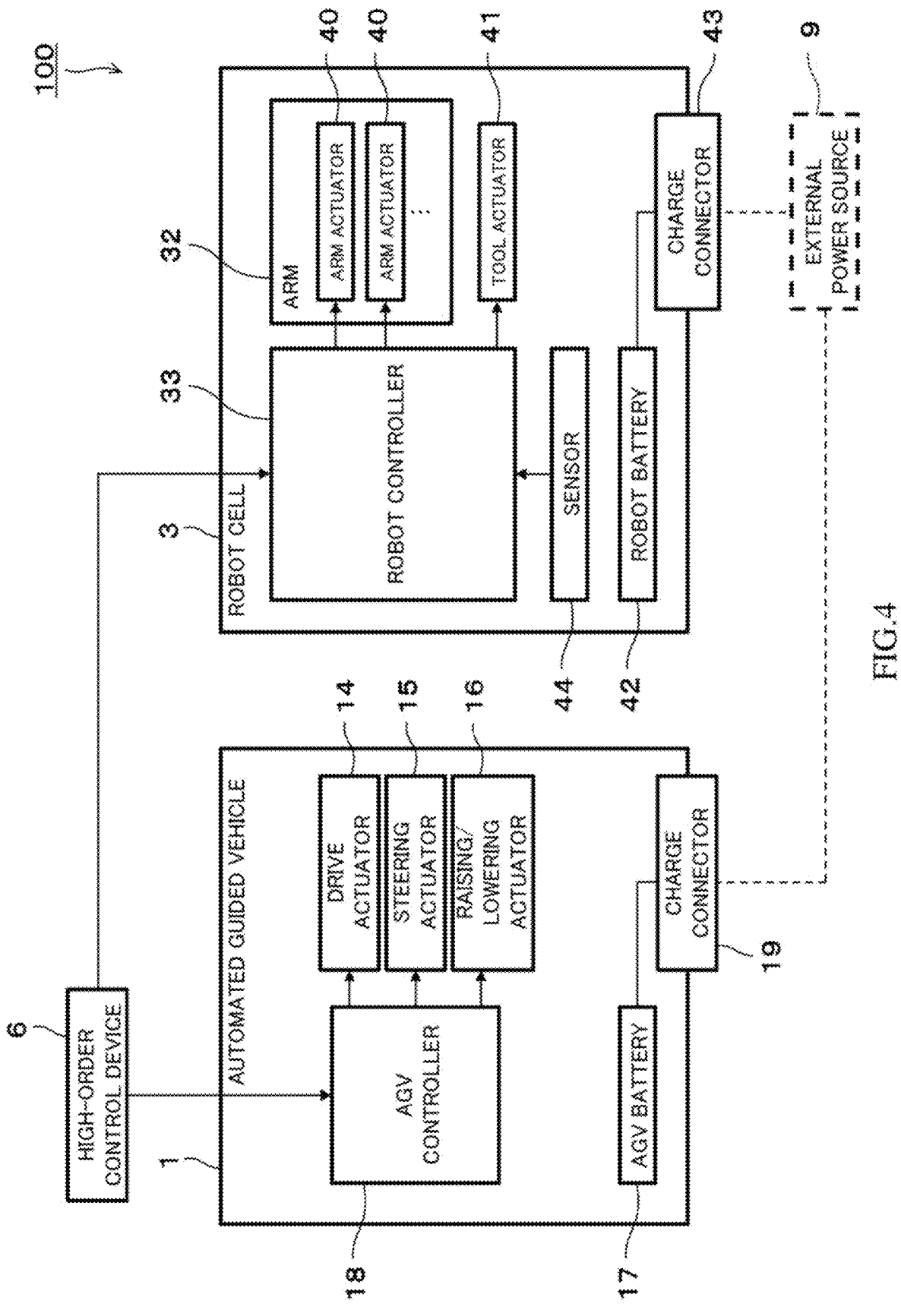
FIG. 4 is a block diagram showing the robot system according to the embodiment.

The robot cell 3 has the robot configuration as described above, i.e., includes a robot base 31, an articulated arm 32, and a robot controller 33 (see FIG. 4). The robot cell 3 is an assembly obtained by adding, to such a robot, a configuration for the robot cell 3 to be transferred by the automated guided vehicle 1 and a configuration for performing work at the workspace B independently of the automated guided vehicle 1.

A proximal end of the articulated arm 32 is connected to the robot base 31. The articulated arm 32 includes link members, joints connecting the adjacent link members rotatably around corresponding rotation axes, and arm actuators 40 (see FIG. 4) corresponding to the joints. The shown six-axis arm of a vertical articulated and single arm type is merely an example. The articulated arm 32 may be a horizontal articulated type. The articulated arm 32 may be a double arm type. In a case of a horizontal articulated and double arm type, the rotation axes of two articulated arms 32 with respect to the robot base 31 may be coaxial with each other. The number of the joints or the link members included in one articulated arm 32 is not particularly limited.

The robot cell 3 includes a housing 34 and a frame 35. As an example, the housing 34 is formed in a rectangular box shape. The frame 35 includes a bottom support portion 35a that supports the bottom of the housing 34, and four legs 35b protruding downward from the bottom support portion 35a. The bottom surface of the housing 34 forms a seat surface 36 (see FIG. 3) to be mounted on the support surface 10 of the automated guided vehicle 1. The four legs 35b form ground contact portions 37 protruding downward of the seat surface 36 so as to contact with the ground. Casters 38 may be provided at lower ends of the legs 35b, and in this case, the casters 38 also form the ground contact portions 37 together with the legs 35b. When the ground contact portions 37 contact with the ground, the seat surface 36 is separated upward from the support surface 10 and is parallel to the ground. The frame 35 may include side support portions 35c that support or reinforce a side portion of the housing 34, and a ceiling support portion 35d that supports or reinforces a ceiling of the housing 34. The side support portions 35c extend upward from the bottom support portion 35a and the ceiling support portion 35d is connected to upper ends of the side support portions 35c.

As an example, the robot base 31 is mounted on the ceiling surface of the housing 34, and the articulated arm 32 is supported by the bottom support portion 35a via the housing 34. The frame 35 may include an arm support portion provided contiguously to the ceiling support portion 35d so as to cover the ceiling surface, and support may be made by the arm support in a state in which the robot base 31 is located within an inner area of the ceiling surface in a plan view.

The robot cell 3 includes one or more tools 39. Each tool 39 is detachably attached to a distal end of the articulated arm 32, in order to perform predetermined work. The tools 39 are placed within a movable area of the distal end of the articulated arm 32. As an example, the tools 39 are mounted on the ceiling surface of the housing 34. The robot cell 3 includes a tool actuator 41 (see FIG. 4) that operates each tool 39. For example, in a case where the tool 39 is a hand including a finger mechanism having fingers contactable/separable with/from each other, the finger mechanism is driven by the tool actuator 41. In a case where the tool 39 is a hand for holding an object by suction, the tool actuator 41 generates a pressure for suction. The tool actuator 41 may be attached to the ceiling surface of the housing 34, or may be stored in the housing 34. A workpiece may be mounted on the ceiling surface of the housing 34.

In a state in which the robot cell 3 contacts with the ground and the ascending/descending body 13 of the automated guided vehicle 1 is at a lower limit position of an ascendable/descendable range, the horizontal portion 11a can be caused to enter the space between the ground and the seat surface 36, by the automated guided vehicle 1 traveling by itself to advance toward the robot cell 3. The width of the frame 35 (the interval between the ground contact portions 37) is greater than the width of the horizontal portion 11a, and therefore the above entry is allowed.

Figure 3A:
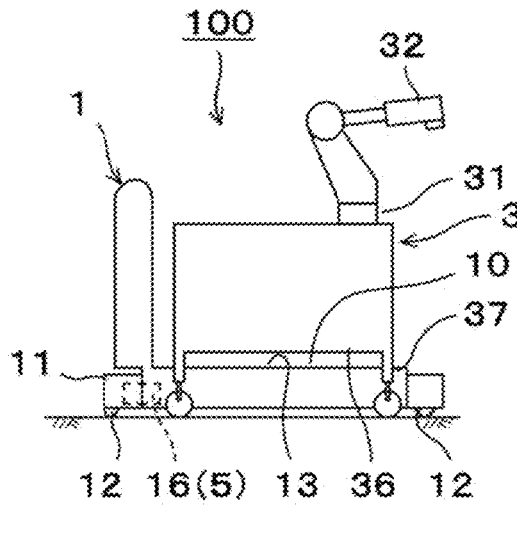
FIG. 3A is a side view showing a placed state.
Figure 3B:
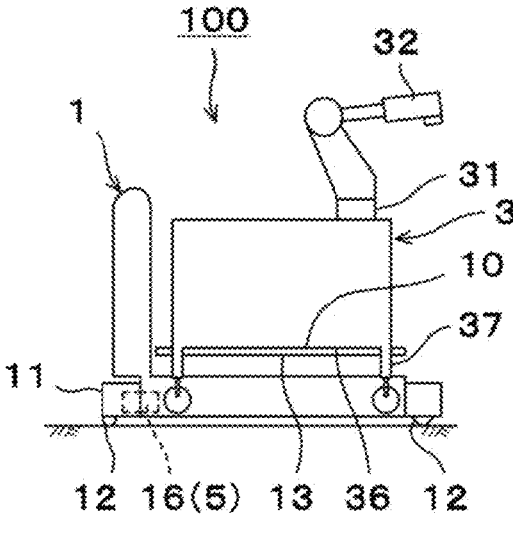
FIG. 3B is a side view showing a transferable state.

With reference to FIG. 3A and FIG. 3B, when the horizontal portion 11a has merely entered the space between the ground and the seat surface 36, the robot cell 3 is in a "placed state". The ground contact portions 37 contact with the ground, and the seat surface 36 is separated upward from the support surface 10. Here, the seat surface 36 is opposed to the support surface 10 in the up-down direction. When the ascending/descending body 13 ascends, the support surface 10 contacts with the seat surface 36 from below. When the ascending/descending body 13 further ascends, the robot cell 3 is switched from the "placed state" to a "transferable state". The seat surface 36 is mounted on the support surface 10, and the ground contact portions 37 are separated from the ground. The robot cell 3 is lifted by the ascending/descending body 13 of the automated guided vehicle 1 and is supported by the support surface 10 of the automated guided vehicle 1. In the transferable state, the robot cell 3 is transferred by the automated guided vehicle 1 traveling. When the ascending/descending body 13 descends, the ground contact portions 37 contact with the ground. When the ascending/descending body 13 further descends, the robot cell 3 is switched from the "transferable state" to the "placed state". The ground contact portions 37 contact with the ground, and the support surface 10 is separated downward from the seat surface 36. In the placed state, the horizontal portion 11a can be pulled out from the space between the ground and the seat surface 36 by the automated guided vehicle 1 moving back. The robot cell 3 is separated from the automated guided vehicle 1 and is supported by the ground.

In the present embodiment, a switching mechanism 5 that performs switching between the placed state and the transferable state is realized by the ascending/descending body 13 of the automated guided vehicle 1 and a raising/lowering actuator 16 which drives the ascending/descending body 13. The switching mechanism 5 may have any configuration that enables the support surface 10 to move in the up-down direction relative to the seat surface 36, and may be provided to the robot cell 3. The switching can be realized through up-down-direction expansion/contraction of the ground contact portions 37 themselves or a jack attached separately from the ground contact portions 37. In a case where the switching mechanism 5 is provided to the robot cell 3, expansion/contraction may be realized by a pneumatic cylinder and the robot cell 3 may include a compressor as an air pressure source of the pneumatic cylinder.

As shown in FIG. 4, the automated guided vehicle 1 includes a drive actuator 14, a steering actuator 15, the raising/lowering actuator 16, an AGV battery 17, and an AGV controller 18. The drive actuator 14 rotationally drives the wheel 12 (front wheel and/or rear wheel). The drive actuator 14 moves the automated guided vehicle 1 forward/backward or stops the automated guided vehicle 1, or adjusts the speed and the acceleration of the automated guided vehicle 1. The steering actuator 15 changes the direction of the wheel 12 (front wheel and/or rear wheel). The steering actuator 15 changes the moving direction of the automated guided vehicle 1 or the turning radius of the automated guided vehicle 1. The raising/lowering actuator 16 raises/lowers the ascending/descending body 13 and therefore the support surface 10, relative to the vehicle body 11. The drive actuator 14, the steering actuator 15, and the raising/lowering actuator 16 are formed by electric motors, for example.

The AGV battery 17 serves as a power source of electric components, such as the actuators 14 to 16 and the AGV controller 18, provided to the automated guided vehicle 1. The AGV battery 17 is held by the vehicle body 11, for example. A drive voltage of the AGV controller 18 is lower than drive voltages of the actuators 14 to 16. The AGV battery 17 may be a power source device including a high-potential battery and a step-down circuit (e.g., DC/DC converter) interposed between the battery and an electric component whose drive voltage is relatively low. The AGV battery 17 may be a power source device including a low-potential battery serving as a power source of an electric component (e.g., AGV controller 18) whose drive voltage is relatively low and a high-potential battery serving as a power source of an electric component (e.g., actuators 14 to 16) whose drive voltage is relatively high, separately from each other. The automated guided vehicle 1 includes a charge connector 19 configured to be connectable to an external power source 9, for charging the AGV battery 17.

The AGV controller 18 controls operations of the drive actuator 14, the steering actuator 15, and the raising/lowering actuator 16. The AGV controller 18 controls the traveling path or the position of the automated guided vehicle 1 through operation control for the drive actuator 14 and the steering actuator 15. A method for guiding the automated guided vehicle 1 is not particularly limited. For example, a simultaneous localization and mapping (SLAM) method may be adopted. The AGV controller 18 performs switching between the transferable state and the placed state through operation control for the raising/lowering actuator 16.

The robot cell 3 includes the robot controller 33, the arm actuators 40, the tool actuator 41, and a robot battery 42. As described above, the arm actuators 40 form the articulated arm 32 and rotationally drive the link members of the articulated arm 32. The tool actuator 41 drives the tool 39 attached to the articulated arm 32.

The robot controller 33 controls operations of the arm actuators 40 and therefore operation of the articulated arm 32. The robot controller 33 controls operation of the tool actuator 41 and therefore operation of the tool 39. The robot controller 33 includes a memory such as a ROM or a RAM, a computer such as a CPU, and a servo controller. The memory stores a basic program as the robot controller 33 and information such as various fixed data. The computer reads and executes software such as the basic program stored in the memory, thus controlling various operations of the articulated arm 32 and the tool 39.

The robot battery 42 serves at least as a power source of the robot controller 33. Further, the robot battery 42 serves as a power source of electric components, such as the articulated arm 32 (in particular, arm actuators 40 thereof), composing the robot cell 3. The robot battery 42 also serves as a power source of the tool actuator 41. The robot battery 42 is stored in the housing 34, for example. A drive voltage of the robot controller 33 is lower than drive voltages of the actuators 40, 41. The robot battery 42 may be a power source device including a high-potential battery and a step-down circuit (e.g., DC/DC converter) interposed between the high-potential battery and an electric component (e.g., robot controller 33) whose drive voltage is relatively low. The robot battery 42 may be a power source device including a low-potential battery serving as a power source of an electric component whose drive voltage is relatively low and a high-potential battery serving as a power source of an electric component (e.g., actuators 40, 41) whose drive voltage is relatively high, separately from each other. The robot cell 3 includes a charge connector 43 configured to be connectable to the external power source 9, for charging the robot battery 42.

The robot system 100 includes a high-order control device 6 that performs integrated control for operations of the automated guided vehicle 1 and the robot cell 3. As an example, the high-order control device 6 may be provided separately from the automated guided vehicle 1 and the robot cell 3, and may be connected so as to be wirelessly communicable with the AGV controller 18 and the robot controller 33. The high-order control device 6 may be a distributed type, and may be composed of a controller provided separately from the automated guided vehicle 1 and the robot cell 3, and the AGV controller provided to the automated guided vehicle 1 and/or the robot controller provided to the robot cell 3. The AGV controller 18 controls operations of the actuators 14 to 16 on the basis of a command from the high-order control device 6. Thus, the position and the movement path of the automated guided vehicle 1 are controlled, switching between the placed state and the transferable state is controlled, and the position of the robot cell 3 is controlled. The AGV controller 18 may output information indicating the remaining capacity of the AGV battery 17 to the high-order control device 6. Thus, the high-order control device 6 can recognize which automated guided vehicle 1 can be operated, and can estimate the operable time thereof.

The robot cell 3 includes a mounting detector that detects whether or not the seat surface 36 is mounted on the support surface 10, at the time of switching between the transferable state and the placed state through an action of the switching mechanism 5. In the present embodiment, a sensor 44 serves as the mounting detector.

Figure 5A:
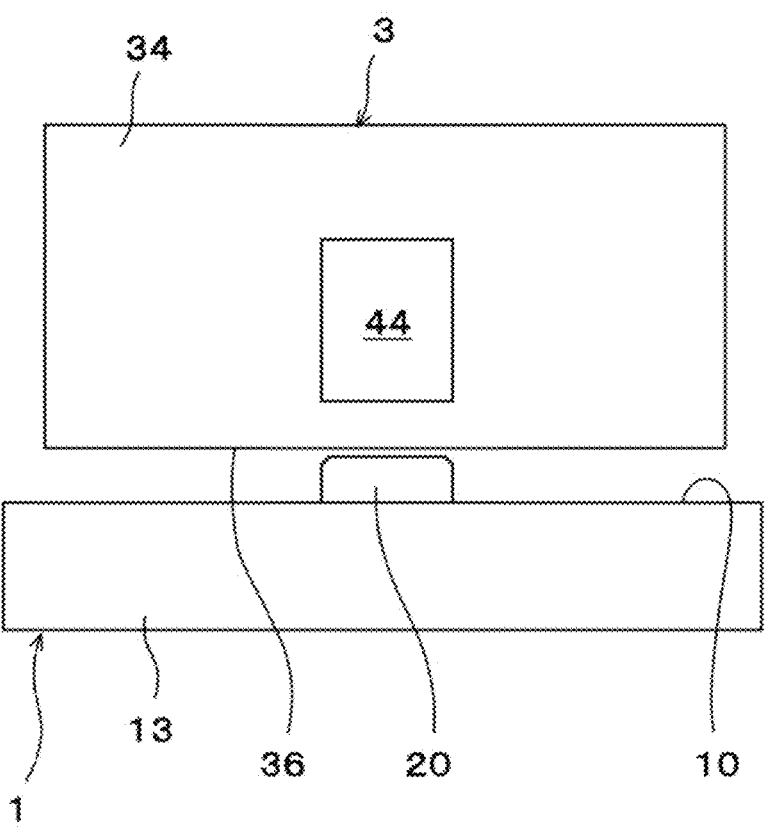
FIG. 5A illustrates a mounting detector (sensor) in the placed state according to the embodiment.
Figure 5B:
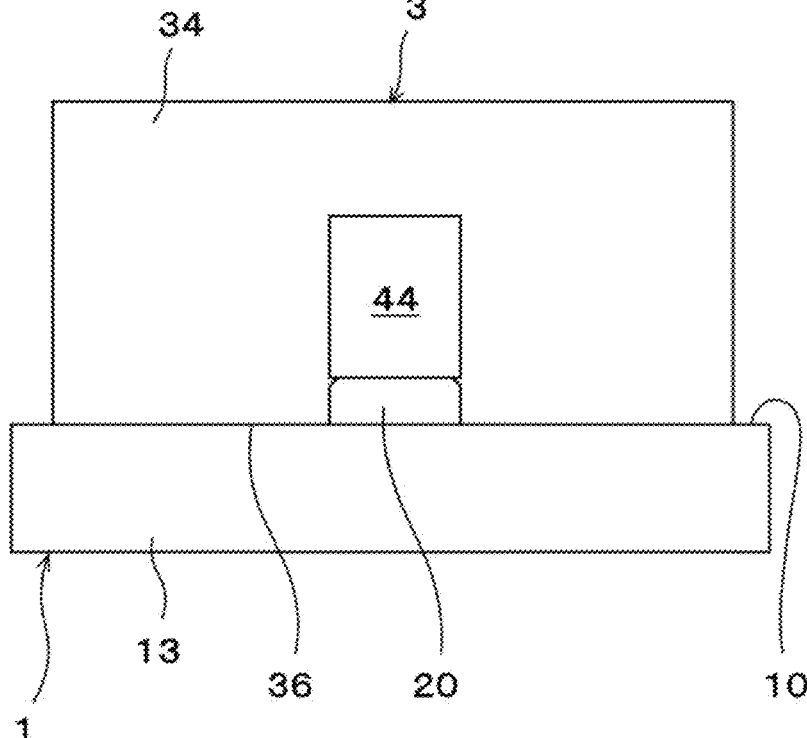
FIG. 5B illustrates the mounting detector (sensor) in a transferable state according to the embodiment.

With reference to FIG. 5A and FIG. 5B, in the present embodiment, one sensor 44 is provided at the seat surface 36 of the robot cell 3. On the other hand, a protrusion 20 is provided on the support surface 10 of the automated guided vehicle 1. The protrusion 20 has a dog-tooth shape. As shown in FIG. 5A, in the placed state, even when the horizontal portion 11*a* has entered the space under the seat surface 36, the sensor 44 is sufficiently separated from the protrusion 20. The sensor 44 outputs a detection signal (separation detection signal) indicating that the seat surface 36 is not mounted on the support surface 10, to the robot controller 33. As shown in FIG. 5B, in the transferable state, the sensor 44 contacts with or comes close to the protrusion 20. The sensor 44 outputs a detection signal (mounting detection signal) indicating that the seat surface 36 is mounted on the support surface 10, to the robot controller 33. The sensor 44 is configured to change a signal output value in accordance with whether or not the sensor 44 contacts with or is close to the protrusion 20. Examples of the sensor 44 include a limit switch, a proximity switch, and a fiber sensor.

With reference to FIG. 4 again, the robot controller 33 outputs information (hereinafter, may be referred to as mounting information) indicating whether or not the own seat surface 36 is mounted on the support surface 10, to the high-order control device 6, on the basis of the detection signal from the sensor 44. The robot controller 33 may output information indicating the remaining capacity of the robot battery 42 to the high-order control device 6. Thus, the high-order control device 6 can recognize which robot cell 3 can be operated, and can estimate the operable time thereof.

Operation of the robot system 100 configured as described above will be described.

When the robot cell 3 is removed from a certain workspace B, the high-order control device 6 selects one automated guided vehicle 1 that has been sufficiently charged, among the automated guided vehicles 1, and causes the selected automated guided vehicle 1 to travel to the workspace B. The automated guided vehicle 1 advances toward the robot cell 3 and stops in a state in which the horizontal portion 11*a* has entered the space under the seat surface 36 of the robot cell 3. The high-order control device 6 monitors mounting information sent from the robot cell 3. Just after the automated guided vehicle 1 is stopped, the robot cell 3 is in the placed state, and the mounting information sent to the high-order control device 6 indicates that the seat surface 36 is not mounted on the support surface 10.

Next, the AGV controller 18 controls operation of the raising/lowering actuator 16, to switch from the placed state to the transferable state. Through the switching, the sensor 44 outputs a mounting detection signal to the robot controller 33. On the basis of the mounting detection signal, the robot controller 33 can recognize that the own robot cell 3 is supported on the automated guided vehicle 1. While the mounting detection signal is being inputted, the robot controller 33 stops operation of the articulated arm 32.

On the basis of the mounting detection signal, the robot controller 33 outputs, as mounting information, information indicating that the own seat surface 36 is mounted on the support surface 10, to the high-order control device 6. When having stopped operation of the raising/lowering actuator 16, the AGV controller 18 transmits information indicating the stoppage to the high-order control device 6. On the basis of the mounting information and the information sent from the AGV controller 18, the high-order control device 6 can recognize that switching from the placed state to the transferable state is completed.

Next, the high-order control device 6 causes the automated guided vehicle 1 to travel from the workspace B to a predetermined position. The predetermined position may be a place where the robot cell 3 is stored on standby, or may be another workspace B. When the automated guided vehicle 1 has arrived at the predetermined position, the AGV controller 18 controls operation of the raising/lowering actuator 16, to switch from the transferable state to the placed state. Through the switching, the sensor 44 outputs a separation detection signal to the robot controller 33. On the basis of the separation detection signal, the robot controller 33 can recognize that the own robot cell 3 is separated from the automated guided vehicle 1. On the basis of the separation detection signal, the robot controller 33 outputs, as mounting information, information indicating that the own seat surface 36 is separated from the support surface 10, to the high-order control device 6. When having stopped operation of the raising/lowering actuator 16, the AGV controller 18 transmits information indicating the stoppage, to the high-order control device 6. On the basis of the mounting information and the information sent from the AGV controller 18, the high-order control device 6 can recognize that switching from the transferable state to the placed state is completed.

Next, the high-order control device 6 causes the automated guided vehicle 1 to travel to another predetermined position. This other predetermined position may be a place where the automated guided vehicle 1 is stored on standby, or may be the workspace B where the robot cell 3 to be removed is placed. First, the automated guided vehicle 1 moves back so as to pull out the horizontal portion 11*a* from the space between the seat surface 36 and the ground. Thereafter, the automated guided vehicle 1 travels to the other predetermined position.

The robot cell 3 placed at the workspace B performs work, using the robot battery 42 as a power source, in a state of being separated from the automated guided vehicle 1. For performing work, the tool 39 is attached to the distal end of the articulated arm 32. In the present embodiment, the tools 39 are mounted on the ceiling surface of the housing 34, and the articulated arm 32 automatically attaches the tool 39 thereto through operation control for the articulated arm 32 by the robot controller 33. On the basis of a command from the high-order control device 6 or independently of the high-order control device 6, the robot controller 33 controls operation of the articulated arm 32. Thus, the robot cell 3 performs predetermined work at the workspace B, independently of the automated guided vehicle 1.

As described above, the robot system 100 according to the present embodiment includes: the automated guided vehicle 1 that includes the support surface 10 and automatically travels; the robot cell 3 including the seat surface 36 to be mounted on the support surface 10, and the ground contact portions 37 protruding downward from the seat surface 36 so as to contact with the ground; and the switching mechanism 5 that performs switching between the transferable state in which the seat surface 36 is mounted on the support surface 10 and the ground contact portions 37 are separated from the ground, and the placed state in which the seat surface 36 is separated from the support surface 10 and the ground contact portions 37 contact with the ground. When the placed state is switched to the transferable state, the robot cell 3 is separated from the ground and is supported by the automated guided vehicle 1. When the automated guided vehicle 1 travels in the transferable state, the robot cell 3 is transferred. When the transferable state is switched to the placed state, the robot cell 3 is separated from the automated guided vehicle 1 and is placed on the ground. When the robot cell 3 is placed, the automated guided vehicle 1 can travel in an idle state.

The robot cell 3 includes the articulated arm 32, and the robot controller 33 that controls operation of the articulated arm 32. Even when the automated guided vehicle 1 is separated from the robot cell 3 after the robot cell 3 is placed, the robot cell 3 can perform predetermined work, using the articulated arm 32. Therefore, the number of the automated guided vehicles 1 to be used for the robot system 100 can be decreased, and the number of the operable robot cells 3 can be increased. Efficiency of the robot system 100 can be enhanced.

The robot cell 3 further includes the robot battery 42 at least for a power source of the robot controller 33. Even if there is no power supply from outside, the robot cell 3 can be operated in a state of being separated from the automated guided vehicle 1.

The robot cell 3 includes the mounting detector that detects whether or not the seat surface 36 is mounted on the support surface 10 at the time of switching between the transferable state and the placed state. On the basis of a detection result from the mounting detector, it is possible to perform control that contributes to safety improvement in the robot system 100, e.g., control for not moving the articulated arm 32 in the transferable state. This is advantageous for the robot system 100 including the robot cell 3 that can operate independently of the automated guided vehicle 1.

In the present embodiment, the mounting detector is the sensor 44. The automated guided vehicle 1 includes the protrusion 20 provided on the support surface 10, and when the sensor 44 contacts with or comes close to the protrusion 20, the sensor 44 outputs a mounting detection signal indicating that the seat surface 36 is mounted on the support surface 10. The detection can be realized with a simple configuration. In addition, since the detection is based on mechanical or physical contact or closeness, reliability is high.

The robot cell 3 further includes one or more tools 39 to be selectively and detachably attached to the distal end of the articulated arm 32. The automated guided vehicle 1 can transfer also the tools 39 together with the articulated arm 32.

While the embodiment has been described above, modification, addition, and/or deletion may be made for the above configuration, within the scope of the present invention.

Modification 1

Figures 6A, 6B:
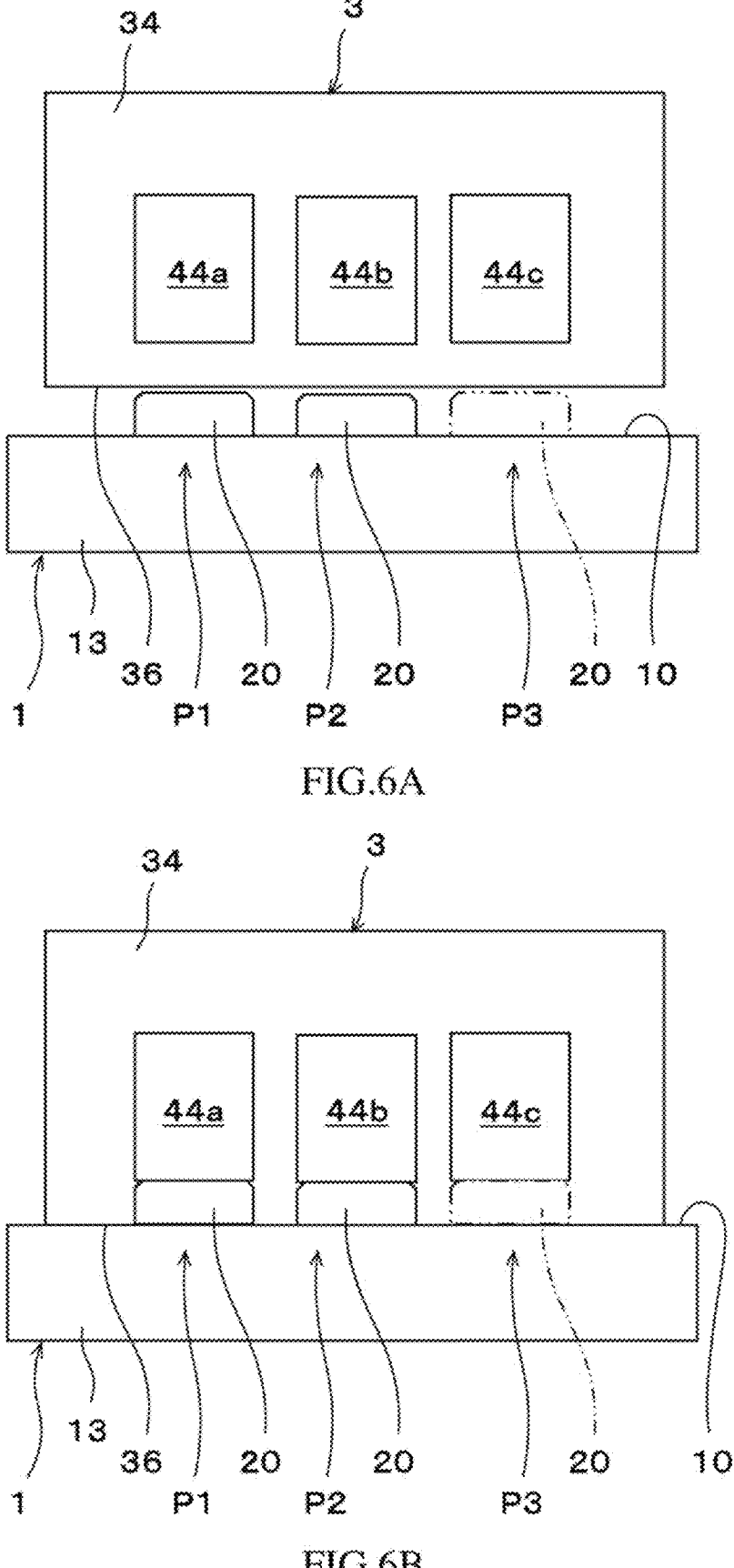
FIG. 6A illustrates mounting detectors (sensors) in the placed state according to modification 1.
FIG. 6B illustrates the mounting detectors (sensors) in the transferable state according to modification 1.

In the above embodiment, the robot cell 3 includes one sensor 44, and the automated guided vehicle 1 includes one protrusion 20 on the support surface 10. However, this configuration may be modified as shown in FIGS. 6A and 6B. In the shown modification, the robot cell 3 includes three sensors (first sensor 44a, second sensor 44b, third sensor 44c). The three sensors 44a to 44c are provided apart from each other above the seat surface 36.

On the other hand, on the support surface 10 of the automated guided vehicle 1, three opposed positions (first position P1, second position P2, third position P3) opposed to the three sensors 44a to 44c at the time of switching between the placed state and the transferable state are conceivable. The automated guided vehicle 1 includes one or more protrusions 20 provided at least at one of the three opposed positions P1 to P3. In accordance with combinations of presence and absence of the protrusions 20 at the three opposed positions P I to P3, there are eight arrangement patterns for the protrusions 20. Seven patterns excluding a pattern in which no protrusion 20 is provided at any position may be adopted. In this modification, the robot system 100 includes the automated guided vehicles 1 (the maximum number of which is equal to the number of the arrangement patterns), and the respective automated guided vehicles 1 are allocated with arrangement patterns unique thereto. That is, one or more protrusions 20 provided to each automated guided vehicle 1 correspond to an identification member for identifying the automated guided vehicle 1. In the shown example of the automated guided vehicle 1, two protrusions 20 are respectively provided to the first position P1 and the second position P2, and there is no protrusion 20 at the third position P3 (arrangement pattern of P1: present, P2: present, P3: absent). The other automated guided vehicles 1 (not shown) are allocated with other arrangement patterns.

In this configuration, just after the automated guided vehicle 1 is stopped in a state in which the horizontal portion 11a has entered the space under the seat surface 36 of the robot cell 3, the robot cell 3 is in the placed state. The first to third sensors 44a to 44c all output separation detection signals. On the basis of the three separation detection signals, the robot controller 33 can recognize that the robot cell 3 is in the placed state.

Next, the AGV controller 18 controls operation of the raising/lowering actuator 16, to switch from the placed state to the transferable state. Through the switching, the first sensor 44a contacts with or comes close to the protrusion 20 at the first position P1, and the second sensor 44b contacts with or comes close to the protrusion 20 at the second position P2. The first sensor 44a and the second sensor 44b output mounting detection signals to the robot controller 33. On the basis of the fact that the mounting detection signal is outputted from at least one of the sensors 44a to 44c, the robot controller 33 can recognize that the own robot cell 3 is supported on the automated guided vehicle 1.

On the other hand, since there is no protrusion 20 at the third position P3, the third sensor 44c continues outputting the separation detection signal. On the basis of which sensor is outputting the mounting detection signal and which sensor is outputting the separation detection signal, the robot controller 33 can recognize by which automated guided vehicle 1 the robot cell 3 is supported.

The robot controller 33 may transmit information indicating by which automated guided vehicle 1 the robot cell 3 is supported, to the high-order control device 6. On the basis of the sent information, the high-order control device 6 can determine whether or not the automated guided vehicle 1 is lifting the robot cell 3 as indicated by a command given to the automated guided vehicle 1.

Modification 2

Figures 7A, 7B:
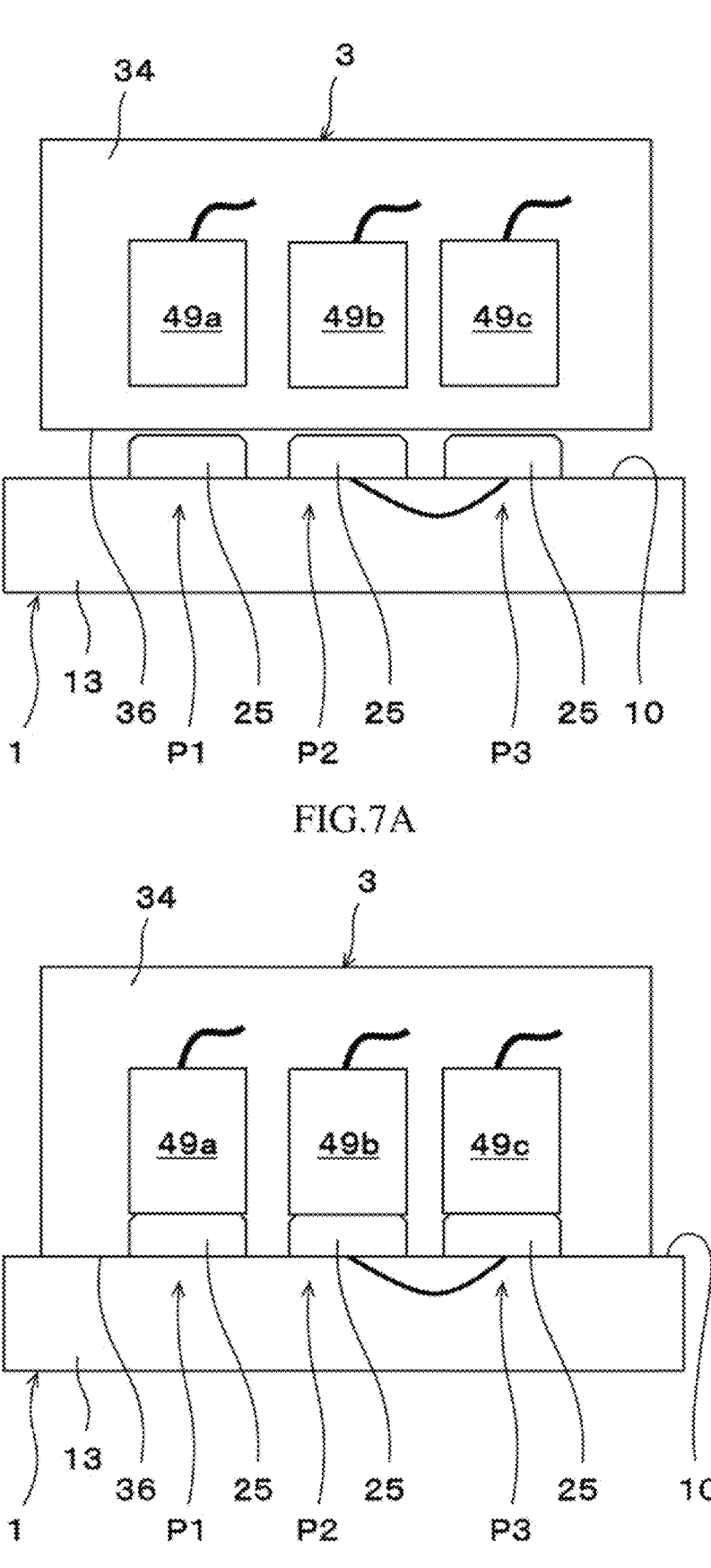
FIG. 7A illustrates mounting detectors (contacts) in the placed state according to modification 2.
FIG. 7B illustrates the mounting detectors (contacts) in the transferable state according to modification 2.

In the above embodiment and the above modification, as the mounting detector, the sensor 44 that changes a signal output value in accordance with whether or not the sensor 44 is close to or contacts with the protrusion 20, is used. However, the mounting detector may be modified as shown in FIGS. 7A and 7B. In the shown modification, the robot cell 3 includes three contacts (first contact 49a, second contact 49b, third contact 49c. The three contacts 49a to 49c are provided apart from each other above the seat surface 36. The three contacts 49a to 49c are connected to a sequencer (not shown) provided to the robot cell 3. The sequencer determines whether or not the three contacts are conductive to each other, and outputs a determination result to the robot controller 33.

On the other hand, on the support surface 10 of the automated guided vehicle 1, one or more contacts 25 are provided at three opposed positions P1 to P3 opposed to the three contacts 49a to 49c at the time of switching between the placed state and the transferable state. Two or more contacts 25 provided on the support surface 10 may be conductive to each other. As in the above modification, the respective automated guided vehicles 1 are allocated with contact arrangement and conduction patterns unique thereto. In the shown example, three contacts 25 are provided and the contact 25 at the second position P2 and the contact 25 at the third position P3 are conductive to each other. Other examples of contact arrangement and conduction patterns include a pattern in which the first position P1 is conductive to the second position P2, a pattern in which the first position P1 is conductive to the third position P3, and a pattern in which the three positions are conductive to each other, and thus there are at least four patterns. Five patterns including a pattern in which the three positions are not conductive to each other may be adopted. Therefore, the robot system 100 is allowed to include four or five automated guided vehicles 1.

In this configuration, just after the automated guided vehicle 1 is stopped in a state in which the horizontal portion 11a has entered the space under the seat surface 36 of the robot cell 3, the robot cell 3 is in the placed state. The first to third contacts 49a to 49c are all open-circuited On the basis of this state, the robot controller 33 can recognize the robot cell 3 is in the placed state.

Next, the AGV controller 18 controls operation of the raising/lowering actuator 16, to switch from the placed state to the transferable state. Through the switching, the first to third contacts 49a to 49c respectively contact with the contacts at the first to third positions P1 to P3. The second contact 49b and the third contact 49c become conductive to each other via the contact 25 at the second position P2 and the contact 25 at the third position P3. On the basis of the conduction states of the first to third contacts 49a to 49c, the robot controller 33 can recognize by which automated guided vehicle 1 the robot cell 3 is supported.

In the above two modifications, the number of the sensors 44*a* to 44*c* and the number of the contacts 49*a* to 49*c* are each three, but these are merely examples. The numbers may be changed as appropriate in accordance with the number of the automated guided vehicles 1 introduced in the robot system 100. In a case of two or three automated guided vehicles 1, the number of sensors or contacts may be two.

Modification 3

In the above modifications 1 and 2, the configurations for identifying by which automated guided vehicle 1 the robot cell 3 is supported, are realized by sensors or contacts, but these are merely examples. An identifier (e.g., QR code (registered trademark) or barcode) for identifying the automated guided vehicle 1 may be provided on the support surface 10 of the automated guided vehicle 1, and the robot cell 3 may include an image sensor for reading the identifier. Also in this case, as in the above embodiment or modifications 1 and 2, it is preferable to have a configuration for detecting that the robot cell 3 is supported by the automated guided vehicle 1 by means of mechanical or physical closeness.

Modification 4

Figure 8:
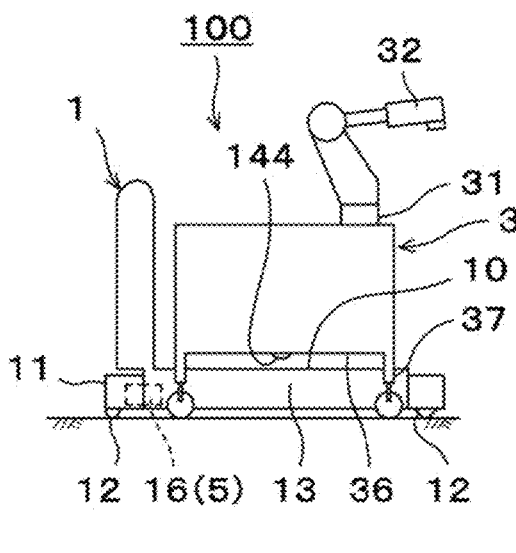
FIG. 8 illustrates a mounting detector (limit switch) according to modification 4.

In the above embodiment and modifications 1 and 2, detection operation of the mounting detector is realized using a protrusion or a contact provided to the automated guided vehicle 1. However, such a special configuration for detection may be eliminated from the automated guided vehicle 1. As shown in FIG. 8, in a case of adopting a limit switch or a contact sensor as a mounting detector 144, even if the support surface of the automated guided vehicle 1 does not have any special configuration, the mounting detector can output a mounting detection signal when the seat surface contacts with the support surface.

Modification 5

Figure 9:
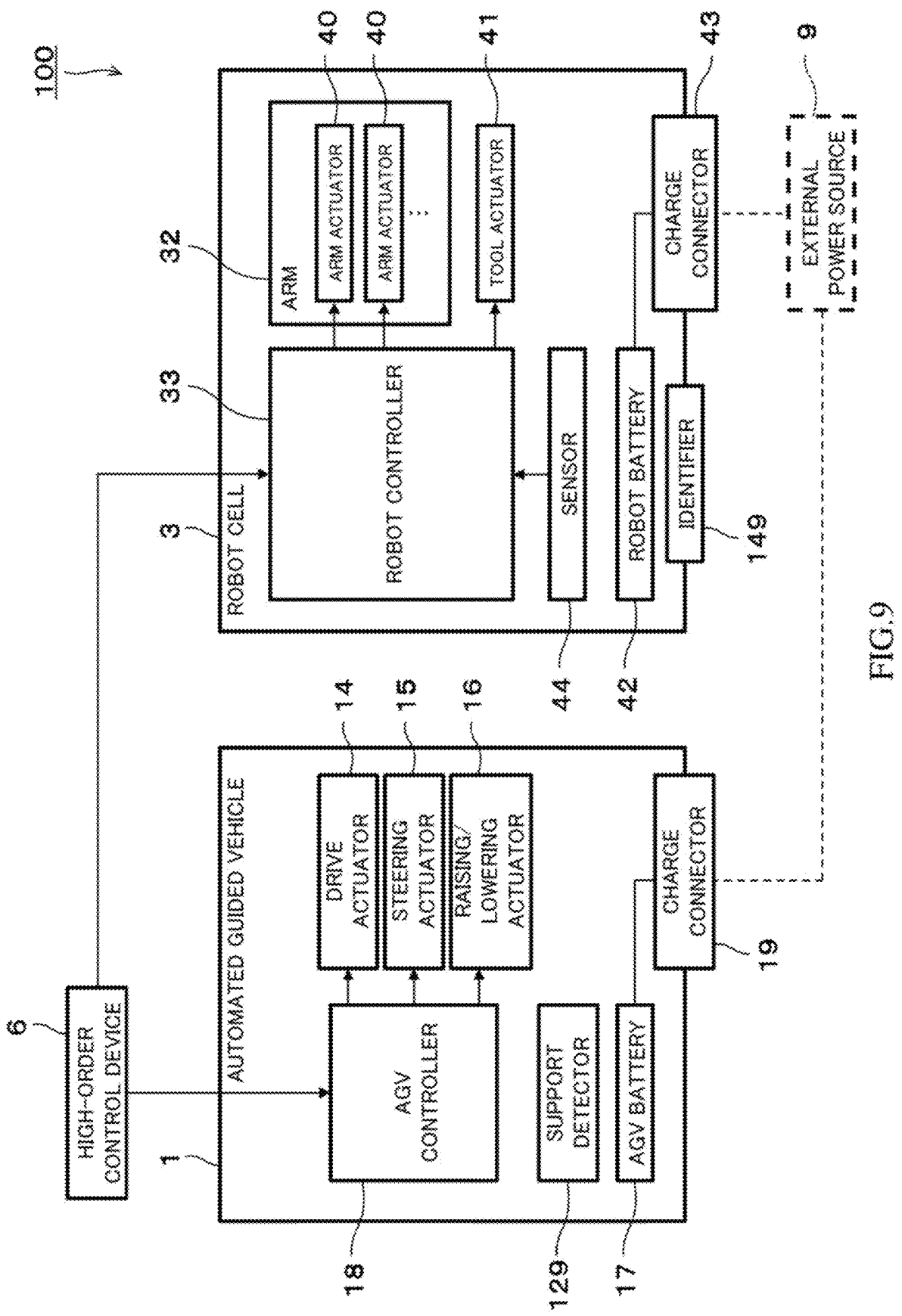
FIG. 9 is a block diagram showing a robot system according to modification 5.

In the above modifications, the configurations for identifying by which automated guided vehicle 1 the robot cell 3 is supported have been described. However, which robot cell 3 is mounted on the automated guided vehicle 1 may be identified. In this case, as shown in FIG. 9, the automated guided vehicle 1 includes a support detector 129 that detects which of the robot cells 3 the automated guided vehicle 1 is supporting. As an example, the support detector 129 may be an image sensor provided to the automated guided vehicle 1. In this case, an identifier (e.g., QR code (registered trademark) or barcode) 149 for identifying the robot cell 3 is provided on the seat surface of the robot cell 3. The support detector (image sensor) 129 outputs image information obtained by reading the identifier 149, to the AGV controller 18. On the basis of the image information, the AGV controller 18 can identify or recognize which robot cell 3 the automated guided vehicle 1 is supporting.

Even in a state in which the robot cell 3 is not supported at a predetermined position on the support surface 10 of the automated guided vehicle 1, it is possible to detect the above state by the support detector 129 of the automated guided vehicle 1. That is, the support detector 129 can detect not only whether or not the support surface 10 is supporting the robot cell 3 but also whether or not the robot cell 3 is properly supported at the predetermined position on the support surface 10. Thus, even if the above state cannot be detected by the mounting detector of the robot cell 3, the state can be detected by the support detector 129 of the automated guided vehicle 1 and traveling of the automated guided vehicle 1 can be prohibited. That is, since the automated guided vehicle 1 includes the support detector 129, safety of the robot system 100 can be further enhanced.

The robot cell 3 may include, instead of the robot battery 42, a power supply connector to be electrically connected to the external power source 9 for supplying power to the articulated arm 32 and the robot controller 33. The power supply connector may be a plug connectable to a commercial power source, or may be a collector shoe contactable with a power supply rail laid along the line A.

The tools 39 may be eliminated from the robot cell 3, and the tools 39 may be arranged at a work rack placed at the workspace B, for example.

The invention claimed is:

1. A robot system comprising:
an automated guided vehicle that includes a support surface and automatically travels;
a robot cell including a seat surface to be mounted on the support surface, a ground contact portion protruding downward from the seat surface so as to contact with a ground, an articulated arm, a robot controller that controls operation of the articulated arm, and a robot battery at least as a power source of the robot controller, wherein the robot cell includes a plurality of contacts located in an arrangement, and the plurality of contacts determine if the robot cell is seated properly on the automated guided vehicle; and
a switching structure that performs switching between a transferable state in which the seat surface is mounted on the support surface and the ground contact portion is separated from the ground, and a placed state in which the seat surface is separated from the support surface and the ground contact portion contacts with the ground,
wherein the robot cell further includes a mounting detector that detects whether or not the seat surface is mounted on the support surface,
the automated guided vehicle includes a support detector that detects whether or not the support surface is supporting the robot cell,
the robot system includes the robot cells, and
the support detector detects and identifies which of the robot cells the support surface is supporting.

2. The robot system according to claim 1, wherein the robot system includes the automated guided vehicles, and
the mounting detector detects on which of the support surfaces among the automated guided vehicles the seat surface is mounted.

3. The robot system according to claim 1, wherein the switching structure includes a raising/lowering actuator that raises/lowers the support surface and is attached to the automated guided vehicle.

4. The robot system according to claim 1, wherein the robot cell further includes one or more tools to be detachably and selectively attached to a distal end of the articulated arm.

5. A robot cell to be transferred by an automated guided vehicle that includes a support surface and automatically travels, the robot cell comprising:
a seat surface to be seated on the support surface;
a ground contact portion protruding downward from the seat surface so as to contact with a ground;
an articulated arm;

15 a robot controller that controls operation of the articulated arm;

a robot battery at least as a power source of the robot controller, wherein the robot cell includes a plurality of contacts located in an arrangement, and the plurality of contacts determine if the robot cell is seated properly on the automated guided vehicle;

a mounting detector that detects whether or not the seat surface is mounted on the support surface at a time of switching between a transferable state in which the seat surface is mounted on the support surface and the ground contact portion is separated from the ground, and a placed state in which the seat surface is separated from the support surface and the ground contact portion contacts with the ground; and an identifier that uniquely identifies the robot cell to the automated guided vehicle when the seat surface is seated on the support surface of the automated guided vehicle.

6. The robot system according to claim 1, wherein the robot system includes the automated guided vehicles.

7. The robot system according to claim 1, wherein the mounting detector detects on which of the support surfaces among the automated guided vehicles the seat surface is mounted.

8. The robot system according to claim 1, wherein a housing of the robot cell is a cuboid.

9. The robot system according to claim 1, wherein the seat surface is located external to the robot cell in the transferable state.

10. The robot cell according to claim 5, wherein a housing is a cuboid.

11. The robot cell according to claim 5, wherein the seat surface is located external to the robot cell in the transferable state.

12. The robot system according to claim 1, wherein the plurality of contacts are used to determine which particular automated guided vehicle is supporting the robot cell.

13. The robot system according to claim 1, wherein the automated guided vehicle includes a corresponding number of second contacts that align with the plurality of contacts of the robot cell.

14. The robot system according to claim 13, wherein two or more of the second contacts are conductive to each other.

15. The robot system according to claim 14, wherein the second contacts are located on the support surface of the automated guided vehicle.

* * * * *